(12) United States Patent
Kinoshita

(10) Patent No.: US 11,988,231 B2
(45) Date of Patent: May 21, 2024

(54) DIAGNOSTIC DEVICE FOR HYDRAULIC PRESSURE CONTROL ACTUATOR

(71) Applicant: Fuji Jukogyo Kabushiki Kaisha, Tokyo (JP)

(72) Inventor: Takahiro Kinoshita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 2425 days.

(21) Appl. No.: 14/221,200

(22) Filed: Mar. 20, 2014

(65) Prior Publication Data

US 2014/0297137 A1 Oct. 2, 2014

(30) Foreign Application Priority Data

Mar. 27, 2013 (JP) ................. 2013-065499

(51) Int. Cl.
*F16B 19/00* (2006.01)
*F15B 19/00* (2006.01)

(52) U.S. Cl.
CPC ................. *F15B 19/005* (2013.01)

(58) Field of Classification Search
USPC ....................... 701/51, 53; 137/12
See application file for complete search history.

(56) References Cited

U.S. PATENT DOCUMENTS

| | | | |
|---|---|---|---|
| 4,220,059 A * | 9/1980 | Mizuno et al. | 477/68 |
| 2008/0227599 A1* | 9/2008 | Takagi | 477/115 |
| 2012/0041654 A1* | 2/2012 | Wilson et al. | 701/51 |
| 2012/0152368 A1* | 6/2012 | Ferraz et al. | 137/12 |

FOREIGN PATENT DOCUMENTS

| | | |
|---|---|---|
| JP | 09-250370 A | 9/1997 |
| JP | 2004-124960 A | 4/2004 |

* cited by examiner

*Primary Examiner* — Edwin A Young
(74) *Attorney, Agent, or Firm* — McGinn IP Law Group, PLLC

(57) ABSTRACT

A diagnostic device diagnoses a hydraulic pressure control actuator which drives a line pressure control valve to regulate a pressure of hydraulic oil between upper and lower limit line pressures, so that the pressure approaches a predetermined target line pressure. The diagnostic device includes: an actual hydraulic pressure detection unit to detect an actual hydraulic pressure; a determination value setting unit to set a high pressure fixation determination value which is increased as the driving revolution rate is increased so as to substantially match a characteristic of the actuator at a time of high pressure fixation; and a fixation determination unit to determine high pressure fixation of the actuator when the actual hydraulic pressure substantially matches the high pressure fixation determination value with a difference between the target line pressure and the upper limit line pressure not lower than a predetermined value.

12 Claims, 5 Drawing Sheets

# DIAGNOSTIC DEVICE FOR HYDRAULIC PRESSURE CONTROL ACTUATOR

CROSS-REFERENCE TO RELATED APPLICATIONS

The present application claims priority from Japanese Patent Application No. 2013-065499 filed on Mar. 27, 2013, the entire contents of which are hereby incorporated by reference.

BACKGROUND

1. Technical Field

The present invention relates to a diagnostic device for an actuator which controls hydraulic pressure to be supplied to controlled objects of a transmission provided in a vehicle such as an automobile, and particularly to a diagnostic device which can properly determine fixation of the actuator to a high pressure position or a low pressure position.

2. Related Art

In a transmission such as continuously variable transmission (CVT) to be mounted on a vehicle such as an automobile, hydraulic oil is pressurized by a mechanical hydraulic pump driven by an engine output, then a line hydraulic pressure is regulated within a predetermined range, for example, by a hydraulic control unit having e.g., a solenoid valve, and is supplied to various hydraulic devices which are to be controlled.

It is demanded to make a proper diagnosis of a failure such as fixation to ON position or OFF position of an actuator for line pressure control of the above-mentioned transmission. For example, Japanese Unexamined Patent Application Publication (JP-A) No. H9-250370 describes a conventional technology related to diagnosis of an actuator for line pressure control, in which a failure of a line pressure control system is determined when a line pressure indication value is other than a maximum value and the line pressure in reality is higher than or equal to the maximum value. In addition, JP-A No. 2004-124960 describes a technology in which a failure of a line pressure control system is determined when a minimum line pressure is indicated at the time of vehicle stop and the line pressure in reality is high.

However, when a hydraulic pump of a transmission is coordinated, for example, with a crankshaft of an engine, and the driving revolution rate of the hydraulic pump is changing during running of a vehicle, regardless of fixation of a line pressure control valve to a high pressure position or a low pressure position, the line pressure, which has been regulated, increases as the number of revolutions of the engine is increased. Thus, the line pressure is not fixed to a constant value. For this reason, when a failure is diagnosed using a constant threshold value as in the above-described conventional technology, diagnosis may not be properly made.

SUMMARY OF THE INVENTION

It is an object of the present invention to provide a diagnostic device for a hydraulic pressure control actuator, the diagnostic device being capable of properly determining fixation of the actuator to a high pressure position or a low pressure position.

An aspect of the present invention provides a diagnostic device for a hydraulic pressure control actuator which drives a line pressure control valve to regulate a pressure of hydraulic oil between an upper limit line pressure and a lower limit line pressure, so that the pressure approaches a predetermined target line pressure, the hydraulic oil being discharged by a hydraulic pump which discharges hydraulic oil in an amount according to a driving revolution rate, the diagnostic device including: an actual hydraulic pressure detection unit configured to detect an actual hydraulic pressure after the pressure is regulated by the line pressure control valve; a determination value setting unit configured to set a high pressure fixation determination value which is increased as the driving revolution rate is increased so as to substantially match a characteristic of the hydraulic pressure control actuator at a time of high pressure fixation; and a fixation determination unit configured to determine high pressure fixation of the hydraulic pressure control actuator when the actual hydraulic pressure substantially matches the high pressure fixation determination value with a difference between the target line pressure and the upper limit line pressure higher than or equal to a predetermined value.

The determination value setting unit may set a low pressure fixation determination value which is increased as the driving revolution rate is increased so as to substantially match a characteristic of the hydraulic pressure control actuator at a time of low pressure fixation, and the fixation determination unit may be configured to determine low pressure fixation of the hydraulic pressure control actuator when the actual hydraulic pressure substantially matches the low pressure fixation determination value with a difference between the target line pressure and the lower limit line pressure higher than or equal to a predetermined value.

Another aspect of the invention provides a diagnostic device for a hydraulic pressure control actuator which drives a line pressure control valve to regulate a pressure of hydraulic oil between an upper limit line pressure and a lower limit line pressure, so that the pressure approaches a predetermined target line pressure, the hydraulic oil being discharged by a hydraulic pump which discharges hydraulic oil in an amount according to a driving revolution rate, the diagnostic device including: an actual hydraulic pressure detection unit configured to detect an actual hydraulic pressure after the pressure is regulated by the line pressure control valve; a determination value setting unit configured to set a low pressure fixation determination value which is increased as the driving revolution rate is increased so as to substantially match a characteristic of the hydraulic pressure control actuator at a time of low pressure fixation; and a fixation determination unit configured to determine low pressure fixation of the hydraulic pressure control actuator when the actual hydraulic pressure substantially matches the low pressure fixation determination value with a difference between the target line pressure and the lower limit line pressure higher than or equal to a predetermined value.

The determination value setting unit may correct a determination value such that the determination value is increased as a hydraulic temperature decreases.

The determination value setting unit may be configured to determine fixation only when an amount of control performed by the hydraulic pressure control actuator, the amount of control being set based on the target line pressure, and an amount of control actually commanded to the hydraulic pressure control actuator are both within a predetermined range.

DETAILED DESCRIPTION

An object of the present invention is to provide a diagnostic device for a hydraulic pressure control actuator, the diagnostic device being capable of properly determining fixation of the actuator to a high pressure position or a low pressure position. The present invention achieves the object by setting a determination value which is increased as the driving revolution rate of the hydraulic pump increases, according to the characteristic of line pressure at the time of fixation of the hydraulic pressure control actuator.
[Implementation]

An implementation of a diagnostic device for a hydraulic pressure control actuator (hereinafter referred to simply as a "diagnostic device") according to the present invention will be described in the following. The diagnostic device in the implementation makes diagnosis of fixation of a solenoid (hydraulic pressure control actuator) for controlling line pressure to a maximum position and a minimum pressure position, the solenoid being configured to drive a hydraulic control valve which regulates a hydraulic pressure (primary pressure) to a predetermined line pressure (secondary pressure), the hydraulic pressure being discharged by an oil pump of a continuously variable transmission (CVT) which is mounted on a vehicle such as an automobile.

Figure 1:
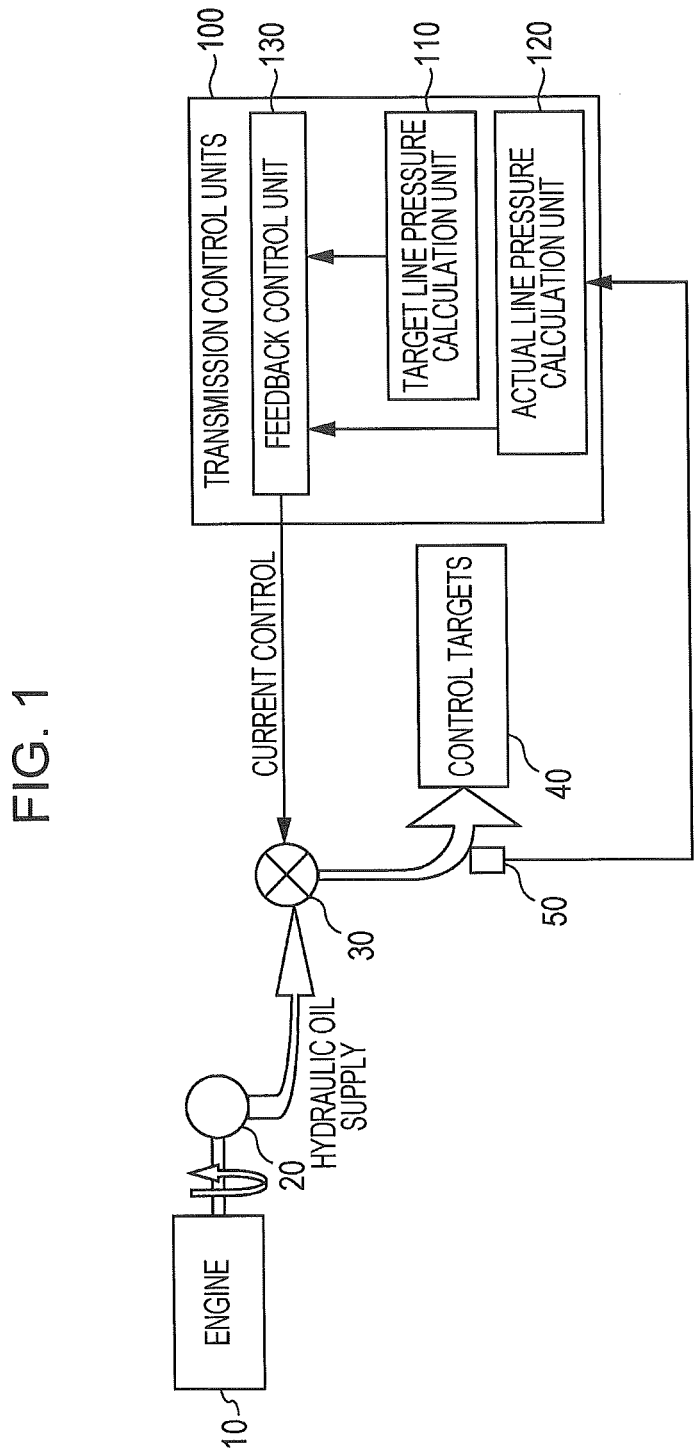
FIG. 1 is a schematic diagram illustrating a configuration of a hydraulic control system of a continuously variable transmission, the hydraulic control system including an implementation of a diagnostic device for a hydraulic pressure control actuator according to the present invention.

FIG. 1 is a schematic diagram illustrating a configuration of a hydraulic control system of a continuously variable transmission, the hydraulic control system including a diagnostic device for a hydraulic pressure control actuator in the implementation. As illustrated in FIG. 1, the continuously variable transmission includes an oil pump 20 driven by an engine 10, a line pressure control solenoid valve 30, controlled objects 40, a line pressure sensor 50, and a transmission control unit 100.

The engine 10 is, for example, an internal combustion engine such as a gasoline engine or a diesel engine which is used as a power source for driving a vehicle. The continuously variable transmission increases or decreases the revolution output of the engine 10, and transmits the increased or decreased output to a power transmission mechanism which provides a driving force to the driving wheels of the vehicle.

The oil pump 20 pressurizes the hydraulic oil (CVT fluid) of the continuously variable transmission up to the primary pressure, and discharges the pressurized hydraulic oil. The oil pump 20 is driven to rotate via a chain which connects from a sprocket provided on a crankshaft of the engine 10 to a sprocket provided on an input shaft. For this reason, the driving revolution rate of the oil pump 20 has a predetermined direct proportional relationship with the crankshaft revolution rate of the engine 10. The oil pump 20 is configured to have a discharge amount and a discharge pressure which increase as the driving revolution rate increases.

The line pressure control solenoid valve 30 is a pressure regulating valve driven by a solenoid which is a hydraulic pressure control actuator. The line pressure control solenoid valve 30 drains part of hydraulic oil supplied from the oil pump 20 as necessary, thereby regulating the line pressure (secondary pressure) which is supplied to the controlled objects 40.

Figure 2:
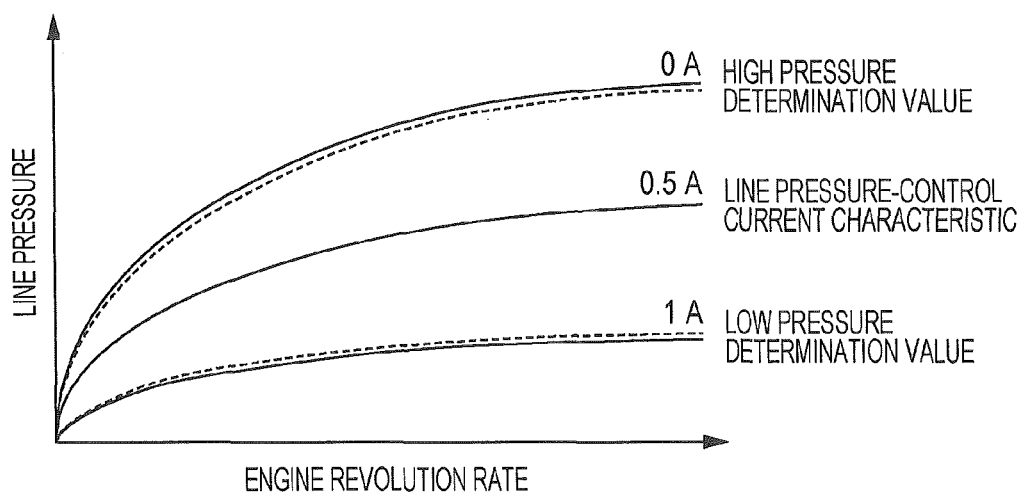
FIG. 2 is a graph schematically illustrating an example of correlation between a current value of a hydraulic pressure control actuator (solenoid), an engine revolution rate, and a line hydraulic pressure.

FIG. 2 is a graph schematically illustrating an example of correlation between a current value of the solenoid, an engine revolution rate, and a line hydraulic pressure. When the solenoid is not energized (control current is 0 A), the line pressure control solenoid valve 30 substantially does not drain the hydraulic oil, and the line pressure then is the upper limit of a controllable range. The amount of oil drained by the line pressure control solenoid valve 30 is increased as the control current of the solenoid is increased, thereby reducing the line pressure. For example, when the control current is 1 A, the drained oil has a maximum amount, and the line pressure then is the lower limit of the controllable range.

As illustrated in FIG. 2, in any of the values of the control current, the line pressure tends to increase as the engine revolution rate is increased. This demonstrates that even when fixation of the solenoid to a high pressure position (0 A position) or a low pressure position (1 A position) occurs, the line pressure is not constant. Thus, the diagnostic device in the present implementation uses a characteristic as a high pressure fixation determination value, the characteristic corresponding to a line pressure which is slightly lower than the line pressure for the characteristic at the time of 0 A in consideration of a maximum of variation and a degree of margin. In addition, the diagnostic device uses a characteristic as a low pressure fixation determination value, the characteristic corresponding to a line pressure which is slightly higher than the line pressure for the characteristic at the time of 1 A in consideration of a maximum of variation and a degree of margin. In FIG. 2, a dashed line illustrates the characteristics of the high pressure fixation determination value and the low pressure fixation determination value. The transmission control unit 100 holds the high pressure fixation determination value and the low pressure fixation determination value as a map in a storage device such as a ROM, the map being figured out from the engine revolution rate. The diagnosis using the determination values will be described in detail below.

The controlled objects 40 are various hydraulic devices which are operated with supplied hydraulic oil having a line pressure regulated by the line pressure control solenoid valve 30. The controlled objects 40 include, for example, a gear shift control actuator, a forward and backward switching clutch, and a lock-up clutch.

The line pressure sensor 50 is a hydraulic sensor which measures a line pressure which has been regulated by the line pressure control valve 30. The output of the line pressure sensor 50 is transmitted to the transmission control unit 100.

The transmission control unit 100 performs centralized control over the continuously variable transmission and its auxiliary devices. The transmission control unit 100 includes an information processing device such as a CPU, a storage device such as a RAM or a ROM, an input/output interface, and a bus for connecting these devices. The transmission control unit 100 performs, for example, line pressure control, forward and backward switching control, transmission gear control, and lock-up control.

The transmission control unit 100 includes a target line pressure calculation unit 110, an actual line pressure calculation unit 120, and a feedback control unit 130. The target line pressure calculation unit 110 calculates a target line pressure based on a running state of the vehicle. The actual line pressure calculation unit 120 calculates a line pressure in reality (actual line pressure) based on an output of the line pressure sensor 50. The feedback control unit 130 performs feedback control over the line pressure control solenoid valve 30 so that the actual line pressure approaches the target line pressure, based on a difference between the target line pressure calculated by the target line pressure calculation unit 110 and the actual line pressure calculated by the actual line pressure calculation unit 120.

Figure 3:
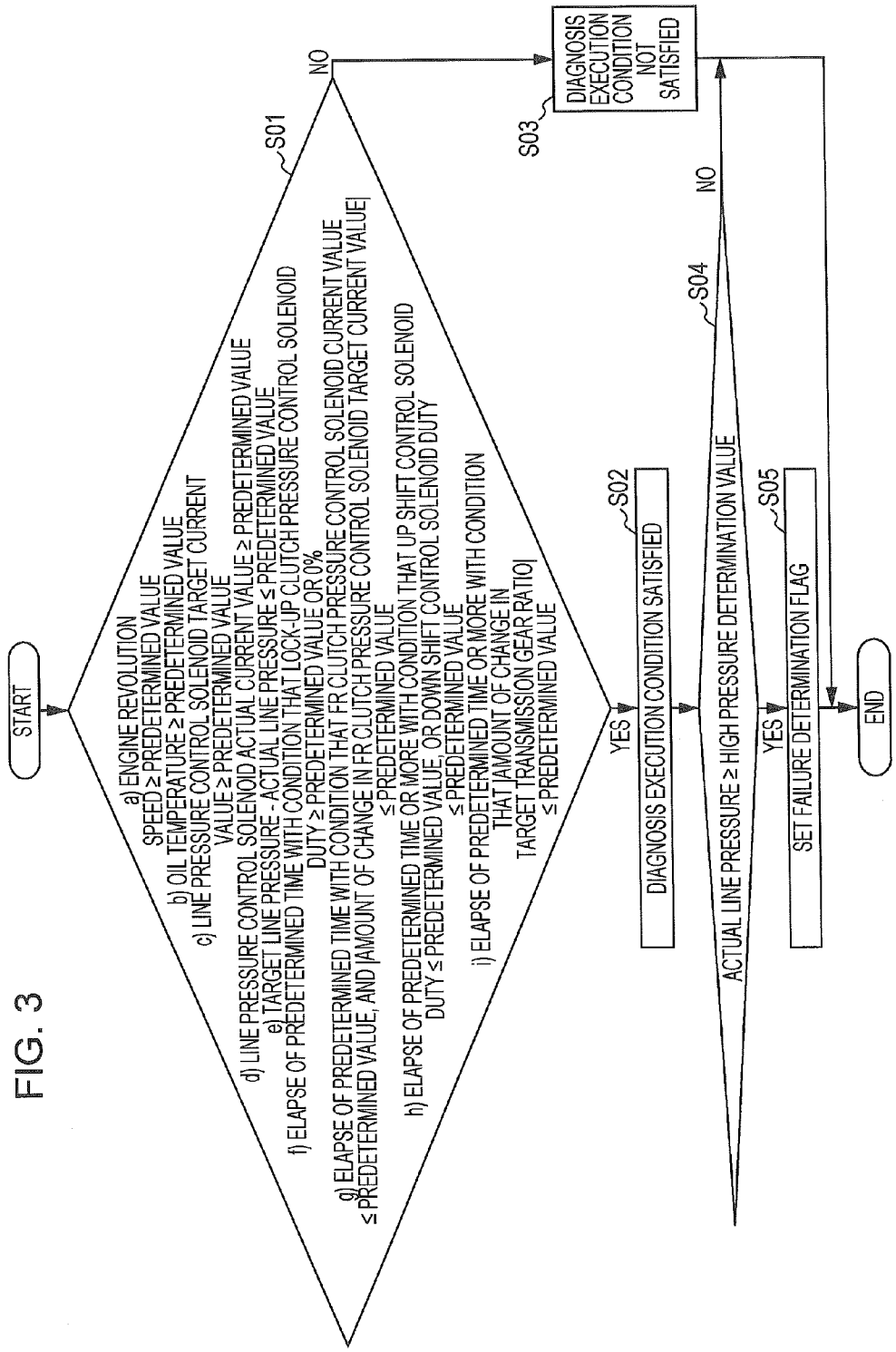
FIG. 3 is a flow chart illustrating diagnosis of high pressure fixation in the diagnostic device for a hydraulic pressure control actuator in the implementation.

The transmission control unit 100 serves also as a diagnostic device which makes diagnosis of high pressure fixation and low pressure fixation of the solenoid of the line pressure control solenoid valve 30. FIG. 3 is a flow chart illustrating diagnosis of high pressure (0 A) fixation in the diagnostic device for a hydraulic pressure control actuator in the implementation. Hereinafter, description will be given for each step sequentially.

<Step S01: Diagnosis Execution Condition Determination>

The transmission control unit 100 determines whether or not all the following conditions described below are satisfied. When all the conditions are satisfied, the flow proceeds to step S02, otherwise when at least one condition is not satisfied, the flow proceeds to step S03. The conditions are as described below. These conditions are set in the consideration that risk of making wrong diagnosis is reduced by making no diagnosis in a state where the operational condition of the transmission is transitional, and a command for regulating the pressure to a high pressure is not issued to the line pressure control solenoid valve 30.

a) Engine revolution rate≥a predetermined value (for example, 1000 rpm).
b) Oil temperature≥a predetermined value (for example, 0° C.)
c) Line pressure control solenoid target current value≥a predetermined value (for example, 0.5 A).
d) Line pressure control solenoid actual current value≥a predetermined value (for example, 0.5 A). Here, the conditions c) and d) indicate that the target line pressure is sufficiently small with respect to the line pressure (0 A) as the upper limit of the controllable range. The condition is set such that the actual current value and the target current value are within the same range, and this is because to prevent making wrong diagnosis which is due to a failure of a current control system which does not actually output the target current value.
e) Target line pressure−actual line pressure≤a predetermined value (for example, −0.5 MPa).
f) Elapse of a predetermined time (for example, 1 second) with condition that lock-up clutch pressure control solenoid duty≥a predetermined value (for example, 90% or 0%).
g) Elapse of a predetermined time (for example, 1 second) with condition that FR clutch pressure control solenoid current value≤a predetermined value (for example, −0.7 A), and |amount of change in FR clutch pressure control solenoid target current value|≤a predetermined value (for example, 0.1 A/s).
h) Elapse of a predetermined time (for example, 1 second) with condition that up shift control solenoid duty≤a predetermined value (for example, 30%).
i) Elapse of a predetermined time (for example, 1 second) with condition that down shift control solenoid duty≤a predetermined value (for example, 30%).
j) Elapse of a predetermined time (for example, 1 second) with condition that |amount of change in target transmission gear ratio|≤a predetermined value (0.3 [1/s]).

<Step S02: Diagnostic Execution Condition Satisfied>

Because the execution condition for diagnosis of high pressure fixation of the line pressure control solenoid valve 30 is satisfied, the operational flow of the transmission control unit 100 proceeds to step S04.

<Step S03: Diagnostic Execution Condition Not Satisfied>

Because the execution condition for diagnosis of high pressure fixation of the line pressure control solenoid valve 30 is not satisfied, the transmission control unit 100 terminates (returns) a series of processes.

<Step S04: Diagnostic Condition Determination>

The transmission control unit 100 compares the actual line pressure detected by the line pressure sensor 50 with the above-described high pressure fixation determination value according to the current revolution rate of the engine 10. When the actual line pressure is higher than or equal to the high pressure fixation determination value (when the actual line pressure is substantially the same as the line pressure characteristic at the time of high pressure fixation), the operational flow proceeds to step S05, otherwise, a series of processes is terminated (returned).

<Step S05: Failure Determination Flag Set>

The transmission control unit 100 sets a high pressure fixation failure determination flag for the line pressure control solenoid valve 30, and a series of processes is terminated (returned).

Figure 4:
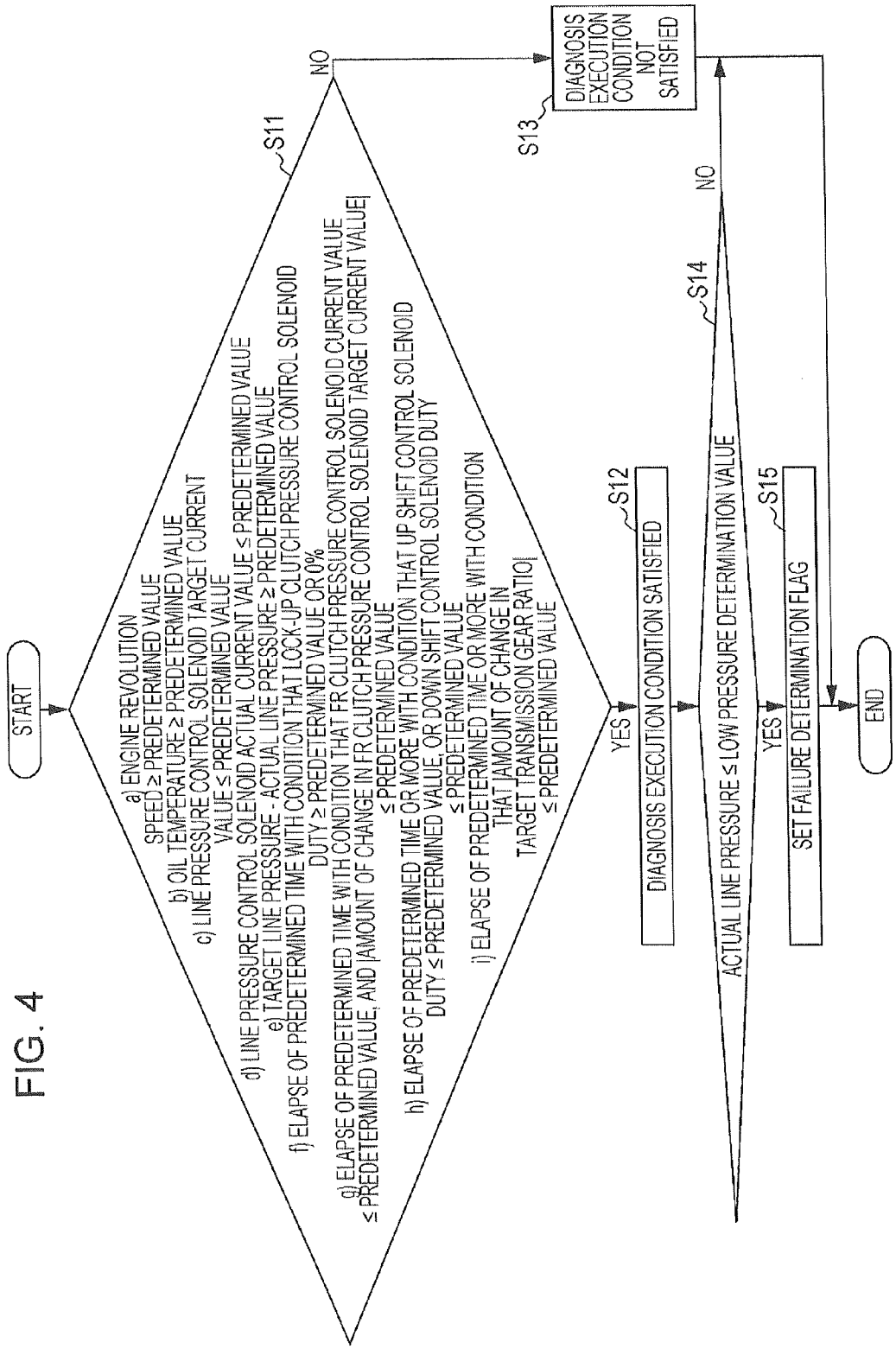
FIG. 4 is a flow chart illustrating diagnosis of low pressure fixation in the diagnostic device for a hydraulic pressure control actuator in the implementation.

FIG. 4 is a flow chart illustrating diagnosis of low pressure (1 A) fixation in the diagnostic device for the hydraulic pressure control actuator in the implementation. Hereinafter, description will be given for each step sequentially.

<Step S11: Diagnosis Execution Condition Determination>

The transmission control unit 100 determines whether or not all the following conditions described below are satisfied. When all the conditions are satisfied, the flow proceeds to step S12, otherwise when at least one condition is not satisfied, the flow proceeds to step S13. The conditions are as described below. These conditions are set in the consideration that risk of making wrong diagnosis is reduced by making no diagnosis in a state where the operational condition of the transmission is transitional, and a command for regulating the pressure to a low pressure is not issued to the line pressure control solenoid valve 30.

a) Engine revolution rate≥a predetermined value (for example, 1000 rpm).
b) Oil temperature a predetermined value (for example, 0° C.)
c) Line pressure control solenoid target current value≤a predetermined value (for example, 0.5 A).
d) Line pressure control solenoid actual current value≤a predetermined value (for example, 0.5 A). Here, the conditions c) and d) indicate that the target line pressure is sufficiently large with respect to the line pressure (1 A) as the lower limit of the controllable range. The condition is set such that the actual current value and the target current value are within the same range, and this is because to prevent making wrong diagnosis which is due to a failure of the current control system which does not actually output the target current value.
e) Target line pressure−actual line pressure a predetermined value (for example, −0.5 MPa).

f) Elapse of a predetermined time (for example, 1 second) with condition that lock-up clutch pressure control solenoid duty≥a predetermined value (for example, 90% or 0%).

g) Elapse of a predetermined time (for example, 1 second) with condition that FR clutch pressure control solenoid current value≤a predetermined value (for example, −0.7 A), and |amount of change in FR clutch pressure control solenoid target current value|≤a predetermined value (for example, 0.1 A/s).

h) Elapse of a predetermined time (for example, 1 second) with condition that up shift control solenoid duty≤a predetermined value (for example, 30%).

i) Elapse of a predetermined time (for example, 1 second) with condition that down shift control solenoid duty≤a predetermined value (for example, 30%).

j) Elapse of a predetermined time (for example, 1 second) with condition that |amount of change in target transmission gear ratio|≤a predetermined value (0.3 [1/s]).

<Step S12: Diagnostic Execution Condition Satisfied>

Because the execution condition for diagnosis of low pressure fixation of the line pressure control solenoid valve 30 is satisfied, the operational flow of the transmission control unit 100 proceeds to step S14.

<Step S13: Diagnostic Execution Condition Not Satisfied>

Because the execution condition for diagnosis of low pressure fixation of the line pressure control solenoid valve 30 is not satisfied, the transmission control unit 100 terminates (returns) a series of processes.

<Step S14: Diagnostic Condition Determination>

The transmission control unit 100 compares the actual line pressure detected by the line pressure sensor 50 with the above-described low pressure fixation determination value according to the current revolution rate of the engine 10. When the actual line pressure is lower than or equal to the low pressure fixation determination value (when the actual line pressure is substantially the same as the line pressure characteristic at the time of low pressure fixation), the operational flow proceeds to step S15, otherwise, a series of processes is terminated (returned).

<Step S15: Failure Determination Flag Set>

The transmission control unit 100 sets a low pressure fixation failure determination flag for the line pressure control solenoid valve 30, and a series of processes is terminated (returned).

Figure 5:
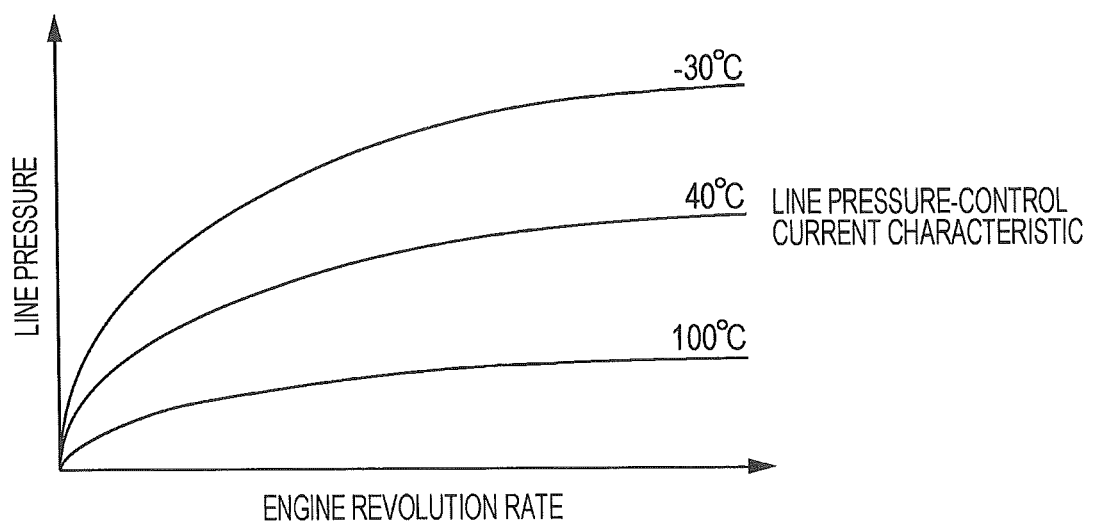
FIG. 5 is a graph schematically illustrating an example of correlation between an oil temperature, an engine revolution rate, and a line hydraulic pressure.

The diagnostic device in the implementation corrects the high pressure fixation determination value and the low pressure fixation determination value according to an oil temperature. FIG. 5 is a graph schematically illustrating an example of correlation between the oil temperature, the engine revolution rate, and the line hydraulic pressure. In FIG. 5, it can be seen that although the control current value of the line pressure control solenoid valve 30 is constant, the line pressure increases as the oil temperature decreases and the viscosity increases accordingly. In the implementation, such an influence of the oil temperature on the line pressure characteristic is taken into consideration, and the high pressure fixation determination value and the low pressure fixation determination value are corrected such that the determination values are increased as the oil temperature decreases. The transmission control units 100 holds the high pressure fixation determination value and the low pressure fixation determination value, for example, as map data base which is read from the engine revolution rate and the oil temperature.

In the above-described implementation, the following effects can be obtained.

(1) The high pressure fixation determination value is set to be increased as the driving revolution rate increases so as to substantially match the characteristic of the line pressure control solenoid at the time of fixation to 0 A position, and when the actual line pressure is higher than or equal to the high pressure fixation determination value irrespective of the target current value of the line pressure control solenoid being greater than or equal to 0.5 A, fixation to 0 A position of the line pressure control solenoid is determined, thereby allowing proper diagnosis to be made even when the actual line pressure is changing according to the driving revolution rate of the hydraulic pump.

(2) The low pressure fixation determination value is set to be increased as the driving revolution rate increases so as to substantially match the characteristic of the line pressure control solenoid at the time of fixation to 1 A position, and when the actual line pressure is lower than or equal to the low pressure fixation determination value irrespective of the target current value of the line pressure control solenoid being less than or equal to 0.5 A, fixation to 0 A position of the line pressure control solenoid is determined, thereby allowing proper diagnosis to be made even when the actual line pressure is changing according to the driving revolution rate of the hydraulic pump.

(3) The high pressure fixation determination value and the low pressure fixation determination value are corrected according to the oil temperature, thus accurate determination can be made by reducing the influence of a change in the viscosity of the hydraulic oil due to a change in the hydraulic temperature.

(4) Only when the line pressure control solenoid target current value which is set based on the target line pressure, and the actual line pressure control solenoid current value are both within a predetermined range, determination of fixation is made, and thus wrong diagnosis due to failure of the control system can be prevented.

(Modifications)

The present invention is not limited to the above-described implementation and various modifications and alterations may be made, and the modified or altered implementation s are also in the technical scope of the present invention. For example, the transmission in the implementation is a chain-type continuously variable transmission which uses a pair of variable pulley and chain as a variator. In addition, the present invention may be applied to a continuously variable transmission having a variator in another type such as a belt variator or a toroidal variator, and to a transmission in another type such as a stepped automatic transmission using a planetary gear set. The transmission in the implementation uses a solenoid as a hydraulic pressure control actuator. Alternatively, an actuator in another type such as a stepping motor may be used. Various types of numerical parameters above are just examples and may be altered as needed.

The invention claimed is:

1. A diagnostic device for a hydraulic pressure control actuator which drives a line pressure control valve to regulate a pressure of hydraulic oil between an upper limit line pressure and a lower limit line pressure, so that the pressure approaches a predetermined target line pressure, the hydraulic oil being discharged by a hydraulic pump which discharges hydraulic oil in an amount according to a driving revolution rate, the diagnostic device comprising:

an actual hydraulic pressure detection unit configured to detect an actual hydraulic pressure after the pressure is regulated by the line pressure control valve;

a determination value setting unit configured to set a high pressure fixation determination value which is increased as the driving revolution rate is increased so as to substantially match a characteristic of the hydraulic pressure control actuator at a time of high pressure fixation; and a fixation determination unit configured to determine high pressure fixation of the hydraulic pressure control actuator when the actual hydraulic pressure substantially matches the high pressure fixation determination value with a difference between the target line pressure and the upper limit line pressure higher than or equal to a predetermined value.

2. The diagnostic device for a hydraulic pressure control actuator according to claim 1, wherein the determination value setting unit sets a low pressure fixation determination value which is increased as the driving revolution rate is increased so as to substantially match a characteristic of the hydraulic pressure control actuator at a time of low pressure fixation, and the fixation determination unit is configured to determine low pressure fixation of the hydraulic pressure control actuator when the actual hydraulic pressure substantially matches the low pressure fixation determination value with a difference between the target line pressure and the lower limit line pressure higher than or equal to a predetermined value.

3. The diagnostic device for a hydraulic pressure control actuator according to claim 2, wherein the determination value setting unit corrects a determination value such that the determination value is increased as a hydraulic temperature decreases.

4. The diagnostic device for a hydraulic pressure control actuator according to claim 3, wherein the determination value setting unit is configured to determine fixation only when an amount of control performed by the hydraulic pressure control actuator, the amount of control being set based on the target line pressure, and an amount of control actually commanded to the hydraulic pressure control actuator are both within a predetermined range.

5. The diagnostic device for a hydraulic pressure control actuator according to claim 2, wherein the determination value setting unit is configured to determine fixation only when an amount of control performed by the hydraulic pressure control actuator, the amount of control being set based on the target line pressure, and an amount of control actually commanded to the hydraulic pressure control actuator are both within a predetermined range.

6. The diagnostic device for a hydraulic pressure control actuator according to claim 1, wherein the determination value setting unit corrects a determination value such that the determination value is increased as a hydraulic temperature decreases.

7. The diagnostic device for a hydraulic pressure control actuator according to claim 6, wherein the determination value setting unit is configured to determine fixation only when an amount of control performed by the hydraulic pressure control actuator, the amount of control being set based on the target line pressure, and an amount of control actually commanded to the hydraulic pressure control actuator are both within a predetermined range.

8. The diagnostic device for a hydraulic pressure control actuator according to claim 1, wherein the determination value setting unit is configured to determine fixation only when an amount of control performed by the hydraulic pressure control actuator, the amount of control being set based on the target line pressure, and an amount of control actually commanded to the hydraulic pressure control actuator are both within a predetermined range.

9. A diagnostic device for a hydraulic pressure control actuator which drives a line pressure control valve to regulate a pressure of hydraulic oil between an upper limit line pressure and a lower limit line pressure, so that the pressure approaches a predetermined target line pressure, the hydraulic oil being discharged by a hydraulic pump which discharges hydraulic oil in an amount according to a driving revolution rate, the diagnostic device comprising:

an actual hydraulic pressure detection unit configured to detect an actual hydraulic pressure after the pressure is regulated by the line pressure control valve;

a determination value setting unit configured to set a low pressure fixation determination value which is increased as the driving revolution rate is increased so as to substantially match a characteristic of the hydraulic pressure control actuator at a time of low pressure fixation; and a fixation determination unit configured to determine low pressure fixation of the hydraulic pressure control actuator when the actual hydraulic pressure substantially matches the low pressure fixation determination value with a difference between the target line pressure and the lower limit line pressure higher than or equal to a predetermined value.

10. The diagnostic device for a hydraulic pressure control actuator according to claim 9, wherein the determination value setting unit corrects a determination value such that the determination value is increased as a hydraulic temperature decreases.

11. The diagnostic device for a hydraulic pressure control actuator according to claim 10, wherein the determination value setting unit is configured to determine fixation only when an amount of control performed by the hydraulic pressure control actuator, the amount of control being set based on the target line pressure, and an amount of control actually commanded to the hydraulic pressure control actuator are both within a predetermined range.

12. The diagnostic device for a hydraulic pressure control actuator according to claim 9, wherein the determination value setting unit is configured to determine fixation only when an amount of control performed by the hydraulic pressure control actuator, the amount of control being set based on the target line pressure, and an amount of control actually commanded to the hydraulic pressure control actuator are both within a predetermined range.

* * * * *